United States Patent

[11] 3,588,226

| [72] | Inventor | Yohei Ikezu<br>Tokyo, Japan |
| --- | --- | --- |
| [21] | Appl. No. | 806,195 |
| [22] | Filed | Mar. 11, 1969 |
| [45] | Patented | June 28, 1971 |
| [73] | Assignee | Kabushiki Kaisha Ricoh<br>Tokyo, Japan |
| [32] | Priority | Mar. 14, 1968 |
| [33] | | Japan |
| [31] | | 43/16675 |

[54] VARIABLE-MAGNIFICATION MICROFILM PROJECTOR EMPLOYING INTERCHANGEABLE LENSES WITH CONSTANT EXIT PUPIL POSITIONING
3 Claims, 2 Drawing Figs.

[52] U.S. Cl. ..................................... 350/183,
350/39, 350/254, 353/39
[51] Int. Cl. ..................................... G02b 15/08
[50] Field of Search ........................ 350/183, 39, 254

[56] References Cited
UNITED STATES PATENTS

| 2,829,559 | 4/1958 | Lautenbacher | 350/183 |
| --- | --- | --- | --- |
| 2,831,396 | 4/1958 | Klemt | 350/183 |
| 2,835,168 | 5/1958 | Lange | 350/183 |
| 2,906,172 | 9/1959 | Klemt | 350/183 |
| 3,363,964 | 1/1968 | Macher | 350/183X |

*Primary Examiner*—David Schonberg
*Assistant Examiner*—Paul A. Sacher
*Attorney*—Burgess, Ryan and Hicks ABSTRACT: A light source, a condenser lens, a microfilm holder, and a screen are fixedly located on an optical axis. A plurality of interchangeable lenses of varying focal lengths may be successively positioned on the optical axis between the microfilm holder and the screen, the exit pupil of all such lenses being positioned at substantially the same position relative to the position of microfilm in the microfilm holder, i.e., substantially at the position where the condenser lens forms an image of the light source.

PATENTED JUN28 1971

3,588,226

INVENTOR

YOHEI IKEZU

BY Burgess, Ryan + Hicks
ATTORNEYS

VARIABLE-MAGNIFICATION MICROFILM PROJECTOR EMPLOYING INTERCHANGEABLE LENSES WITH CONSTANT EXIT PUPIL POSITIONING

BACKGROUND OF THE INVENTION

The present invention relates to a projecting device and more particularly to a projecting device of the type in which the magnification can be arbitrarily varied by using one of a plurality of projection lenses having different focal lengths, while a light source, a condenser lens, a film surface, and a projection screen surface remain stationary and the picture frame size of the film to be projected remains unchanged.

In conventional projection devices of the type in which the magnification can be varied, one method to achieve this result is to employ a zoom lens which can vary continuously its focal length, a second method is to employ a plurality of interchangeable lenses, and a third method is to move the projection screen, that is movable screen method.

In the first method, the zoom lens which is adapted to project an image of a microfilm having a picture frame size of 32 mm. × 45 mm. inevitably requires large lenses and lens barrels. The construction of such a zoom lens is very complicated and the high precision in manufacture is required so that the cost of the lens is very high. Moreover, the resolution of the zoom lens is inferior to that of lenses having a fixed focal length because of the design compromises required in the lens system of the zoom lens.

In the third method, the provision of a movable projection screen inevitably enlarges the projecting device. Consequently, the projecting device becomes expensive and furthermore the operation is slow. Therefore, the conventional practice is to employ the second method, i.e. to interchange high-resolution lenses having different focal lengths. However, when these projection lenses are interchanged the illumination upon the screen varies. In order to eliminate such illumination variations from one lens to another, it is necessary to displace the light source and the condenser lens whenever the projection lens is changed so that the intensity of illumination becomes uniform up to the side edges of the projected picture frame upon the projection screen. However, when the illumination optical system must be arranged so as to be movable, the mechanism becomes complicated, every part must be machined with higher accuracy and the lamp house member including the light source and the condenser lens inevitably becomes large in size. Consequently, the device becomes very expensive.

SUMMARY OF THE INVENTION

In brief, according to the present invention, the exit pupils of a plurality of interchangeable projection lenses are spaced apart from the film surface by the same standard distance when the lenses are in projecting position whereby the magnifications of images to be projected can be arbitrarily varied without changing the positions of the light source, the condenser lens, the film surface position the projection surface or screen or the picture frame size of the film to be projected.

One of the objects of the present invention is to provide a magnification-variable projecting device simple in construction.

Another object of the present invention is to provide a magnification-variable projecting device easy in operation.

A further object of the present invention is to provide a magnification-variable projecting device inexpensive in cost.

The above and other objects, advantages and features of the present invention will become more apparent from the following description taken in conjunction with the accompanying drawing.

DESCRIPTION OF THE PREFERRED EMBODIMENT

Figure 2:
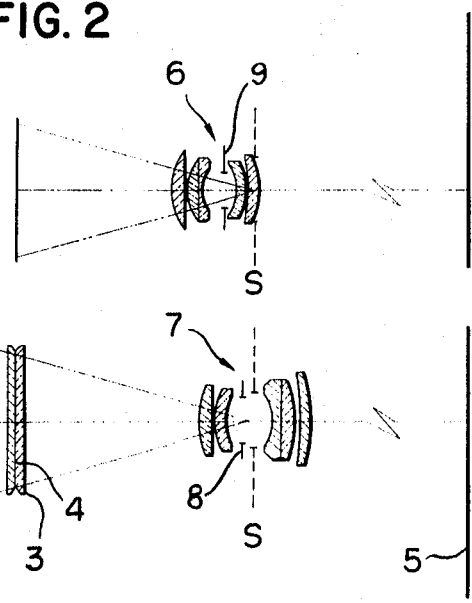
FIG. 2 is a schematic view of an alternative projection lens usable with portions of the device of FIG. 1.
Figure 1:
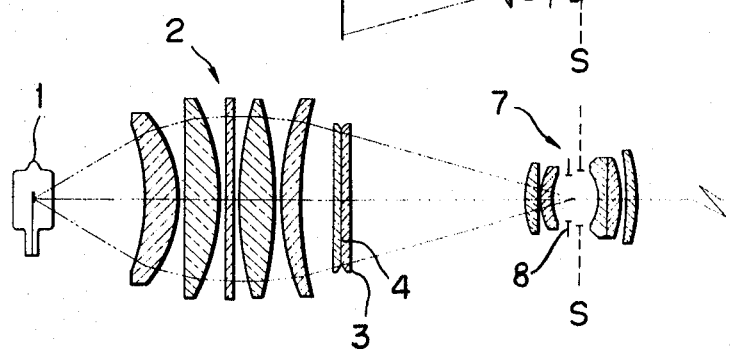
FIG. 1 is a schematic view illustrating the arrangement of a variable-magnification projecting device of the present invention.

In a projecting device (such as microfilm reader or microfilm printer,) a light source 1, a condenser lens 2, a film mask 3, a microfilm 4, and a screen 5 are arranged and disposed in order along an optical axis. Between the mircofilm and the screen 5 is interposed on the same optical axis a projection lens having a focal length of, for example, 60mm. Another projection lens 7 having a focal length of 80 mm. and the same $f$ number with that of the projection lens 6 may be interchanged therewith. As shown lens 7 is equipped with a diaphragm 8 and lens 6 with a diaphragm 9. Both diaphragms are located between lens elements. These two projection lenses 6 and 7 are interchangeable, and they are so designed that when interchanged with the focal plane of each lens coincident with the screen 5, the exit pupil S of each lens is equidistant from the microfilm 4. The example of the data for designing a pair of such interchangeable projection lenses is shown below:

| | Lens 6 | $f=60$mm | F:4 | Lens 7 | $f=80$mm | F:4 |
|---|---|---|---|---|---|---|
| | $v$ | D | N | $v$ | D | N |
| 1 | 20.0 | 4.5 | 1.0 | 40.0 | 4.2 | 1.0 |
| 2 | 50.5 | 0.06 | 1.620 | 89.0 | 0.16 | 1.72 |
| 3 | 18.5 | 3.8 | 1.0 | 24.0 | 6.0 | 1.0 |
| 4 | 12.5 | 14.3 | 1.762 | 286.0 | 4.5 | 1.620 |
| 5 | −13.5 | 0.8 | 1.0 | 16.0 | 17.5 | 1.651 |
| 6 | 106.0 | 5.5 | 1.717 | −18.0 | 2.5 | 1.0 |
| 7 | −19.0 | 0.06 | 1.688 | −24.0 | 0.1 | 1.784 |
| 8 | −176.0 | 3.7 | 1.0 | −108.0 | 7.5 | 1.0 |
| 9 | −31.7 | | 1.757 | 26.8 | | 1.658 |
| | | | 1.0 | | | 1.0 | where V is the Abbe number, D is the lens thickness in mm. and N is the index of refraction with respect to the d-line of the sodium spectrum.

The specifications of the projecting device employing the projection lenses 6 and 7 as described above are as follows:

| | Lens 6 | Lens 7 |
|---|---|---|
| (A) Magnifications | ×14 | ×10. |
| (B) Screen dimensions | Size A2 | Size A3. |
| (C) Distance between screen and the forwardmost lens. | 893.5mm | 870.2mm. |
| (D) Whole lens length | 32.7mm | 42.4mm. |
| (E) Lens back | 50.6mm | 64.2mm. |
| (F) Distance between film and screen: (C)+(D)+E). | 976.8mm | 976.6mm. |
| (G) Position of diaphragm | 10mm from the vertex of 5th element surface. | 5.5mm from the vertex of the 6th element surface. |
| (H) Position of exit pupil | 29.7mm. Both from the apex of the 9th element surface. | 16.07mm. |
| (I) Distance between exit pupil and film: (E)+(H). | 80.3mm | 80.27mm. |

As is clear from the specifications, the image of the light source 1 is focused through the condenser lens 2 at a position spaced from the microfilm 4 by a distance of 80.3 mm. Therefore, the magnifications can be varied between ×14 and ×10 by interchanging the projection lenses 6 and 7 while the arrangement of the light source 1, the condenser lens 2, the microfilm 4, and the screen 5 remain unchanged.

While the present invention has been described with reference to an embodiment employing two interchangeable lenses, it is to be understood that more than two interchangeable projection lenses may be used. Furthermore, it is of course possible to employ the optical system of the present invention in other projecting devices than microfilm readers and printers.

According the the present invention interchangeable a plurality of projection lenses having different focal lengths are provided to be positioned with their exit pupils at the same distance from a screen with the image of the light source focused at the position of the exit pupils of the projection lenses. With this arrangement the magnification during projection can be varied while the light source, a condenser lens, a film supporting surface and the screen remain stationary while sharp images having the same brightness and different magnifications are focused upon the screen. Thus, it is clear that the present invention provides many advantages over known devices because tedious and complicated adjustments in projection can be eliminated when changing magnification, the projecting device according to the present invention is simple in construction and compact in size; and manufacture becomes easier, thereby reducing the fabrication cost.

It is to be understood that variations and modifications can be effected without departing the true spirit of the present invention as described hereinabove and as defined in the appended claims.

I claim:

1. In a variable-magnification microfilm projection device for projecting an image of a frame of microfilm, said device having a fixed light source, a fixed condenser adapted to focus an image of the light source at a first position which is fixed distance along an optical axis from the light source, and means for holding the frame of microfilm on the optical axis at a fixed position relative to the light source, the improvement comprising a plurality of interchangeable projection lenses of the same $f$-number and of different focal lengths, each said lens having an exit pupil and each of which can be put in a projection position on the optical axis with its exit pupil at the first position, said projection lenses when in the projection position all focusing an image of the frame of microfilm at the same distance along the optical axis from the object.

2. The device of claim 1 wherein each of the interchangeable projection lenses is comprised of a plurality of lens elements with a diaphragm positioned between said elements, and in which the lens elements between the diaphragm and the image plane of the lens differ in structure from one of the plurality of lenses to the other.

3. The device of claim 2 wherein the exit pupil of each of the plurality of lenses is located at substantially the same distance from the position of a microfilm when said microfilm is in the microfilm holding means and the lens is in projection position.

UNITED STATES PATENT OFFICE
CERTIFICATE OF CORRECTION

Patent No. 3,588,226          Dated June 28, 1971

Inventor(s) Yohei Ikezu

It is certified that error appears in the above-identified patent and that said Letters Patent are hereby corrected as shown below:

Column 2, line 72,   change "the" (first occurrence) to -- to --;

Column 2, line 72,   delete "interchangeable";

Column 2, line 73,   before "projection" insert -- interchangeable --;

Column 3, line 21,   before "fixed" insert -- a --.

Signed and sealed this 2nd day of May 1972.

(SEAL)
Attest:

EDWARD M. FLETCHER, JR.          ROBERT GOTTSCHALK
Attesting Officer                Commissioner of Patents